US008565539B2

(12) United States Patent
Chao et al.

(10) Patent No.: US 8,565,539 B2
(45) Date of Patent: Oct. 22, 2013

(54) SYSTEM AND METHOD FOR DETERMINING ESTIMATED AGE USING AN IMAGE COLLECTION

(75) Inventors: Hui Chao, San Jose, CA (US); Tong Zhang, San Jose, CA (US); Daniel R. Tretter, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 371 days.

(21) Appl. No.: 13/118,897

(22) Filed: May 31, 2011

(65) Prior Publication Data

US 2012/0308087 A1 Dec. 6, 2012

(51) Int. Cl.
*G06K 9/00* (2006.01)
*G06F 15/177* (2006.01)

(52) U.S. Cl.
USPC ............................ 382/225; 382/115; 709/223

(58) Field of Classification Search
USPC ......... 382/115, 118, 224, 165, 159, 225, 226; 709/224, 223; 348/588, E5.096
See application file for complete search history.

(56) References Cited

U.S. PATENT DOCUMENTS

| 7,319,779 B1* | 1/2008 | Mummareddy et al. ...... 382/118 |
| 7,372,865 B2* | 5/2008 | Scott et al. .................... 370/429 |
| 7,522,773 B2* | 4/2009 | Gallagher et al. ............ 382/224 |
| 8,000,505 B2* | 8/2011 | Gallagher ..................... 382/117 |
| 8,422,794 B2* | 4/2013 | Ptucha et al. ................. 382/209 |
| 2006/0045352 A1 | 3/2006 | Gallagher |
| 2008/0104225 A1 | 5/2008 | Zhang et al. |
| 2009/0192967 A1 | 7/2009 | Luo et al. |
| 2010/0007796 A1 | 1/2010 | Yamaji et al. |
| 2010/0191689 A1 | 7/2010 | Cortes et al. |

OTHER PUBLICATIONS

Tang et et.; Consumer Image Retrieval by Estimating Relation Tree From Family Photo Collections; Hewlett-Packard Laboratories Research Paper, Jul. 5-7, 2010.
Zak Stone et al.; Autotagging Facebook: Social Network Context Improves Photo Annotation; Harvard University; UC Berkeley EECS & ICSI Publication Date: Jun. 23-28, 2008; pp. 1-8.

* cited by examiner

*Primary Examiner* — Sheela Chawan

(57) ABSTRACT

A system and a method are provided for determining an estimated age of an individual of interest based on images in an image collection. An example system includes a memory for storing computer executable instructions, and a processing unit for accessing the memory and executing the computer executable instructions. The computer executable instructions include an age class estimator to classify a plurality of images of the individual into age classes, each age class corresponding to an interval of age, and each image having a known time stamp, a probability determination engine to determine, for each age class, a value of class probability that an image in the collection falls within the age class, an age determination engine to determine a transition time based on the values of class probability and the known time stamp, and to determine the estimated age of the individual based on the determined transition time.

23 Claims, 5 Drawing Sheets

SYSTEM AND METHOD FOR DETERMINING ESTIMATED AGE USING AN IMAGE COLLECTION

BACKGROUND

With the advent of digital cameras and advance in massive storage technologies, people now have the ability to capture many casual images. It is not uncommon to find tens of thousands, if not hundreds of thousands of images taken over a number of years in a personal computer or database. The many images captured of an individual, whether the individual is alone or in group, can be used to provide useful information. For example, information on the age of an individual can be used to determine age-appropriate clothing, products, services, entertainment, and/or medical information to bring to the individual's attention. A tool that facilitates determination of an estimated age of an individual based on images in the image collection would be beneficial.

DETAILED DESCRIPTION

Figure 1A:
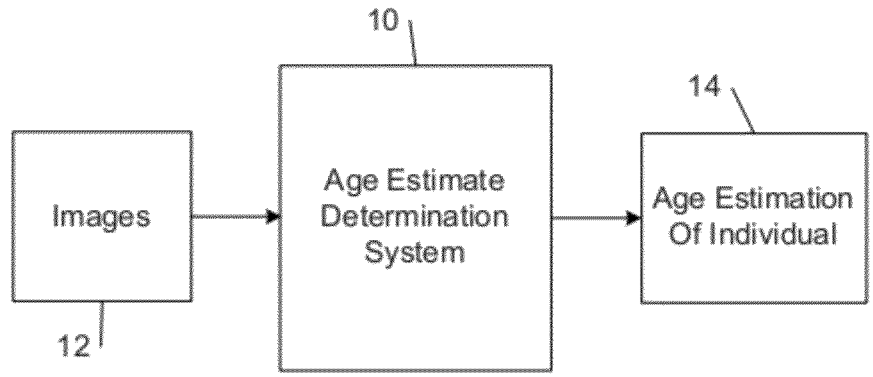
FIG. 1A is a block diagram of an example of an age estimate determination system for determining an estimated age of an individual based on images.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of machine-readable instructions that a computer can interpret and execute to perform one or more specific tasks. A "data file" is a block of information that durably stores data for use by a software application.

The term "computer-readable medium" refers to any medium capable storing information that is readable by a machine (e.g., a computer system). Storage devices suitable for tangibly embodying these instructions and data include, but are not limited to, all forms of non-volatile computer-readable memory, including, for example, semiconductor memory devices, such as EPROM. EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Described herein are novel systems and methods for determining an estimated age of an individual of interest based on images in an image collection. A large amount of face images of an individual over multiple years are analyzed. The result from an age estimator for each face image and associated time stamp are extracted and analyzed. Based on the trends and transitions of the results across multiple years, a more precise estimated age is computed.

In an example system and method herein, a system and method are provided that determine the age of an individual based on his or her face image collection. Automatic age classification of a face image based on learning can be used in a system and method described herein. Age classification can be performed to categorize a face image into different age classes. In a non-limiting example, age classes can be defined as baby (birth to 1 year old (y.o.)), child (1 y.o. to 10 y.o.), youth (10 y.o. to 18 y.o.), adult (18 y.o. to 60 y.o.) and senior (greater than 60 y.o.). Age estimation based on single face image can be rough and error prone. Systems and methods herein determine an estimate of an individual's age based on his or her face image collections, e.g., over multiple years. The result from an age estimator used for classifying each face image and associated time stamp are extracted and analyzed. Based on the trends and transitions of the age classification results across multiple years, a more precise age is determined for the individual.

In a non-limiting example, using a system and method herein, an estimate of an individual's age can be determined based on images in an image collection. The estimated age can be used to determine age-appropriate products, services, entertainment, and/or medical knowledge to direct to the individual's attention.

In an example system and method herein, a system and method are provided that determine an age class (e.g., baby, child, youth, adult or senior) based on images and can be easier to implement where the training data is easier to obtain.

A system and method herein can be implemented to derive a distribution of age classes of an individual within the individual's face duster and use age estimation result from face images in the duster, which is can be more reliable than using a single face image. A system and method herein can be used to integrate age classes distribution together with timestamp information to provide. more accurate age estimation results than a purely machine-learning based approach. A system and method herein can be applied for estimating an individual's age in an image collection (such as photo collections) that span a relatively long period of time.

FIG. 1A shows an example of an age estimate determination system 10 that determines an estimated age of an individual 14 using images from image collection 12 (which includes images of the individual). The age estimate determination system 10 receives image data representative of image collection 12, and, according to example methods described herein, determines an estimated age of an individual 14 using images from image collection 12. The input to the age estimate determination system 10 also can be several collections of images that include images of the individual.

An example source of images is personal photos of a consumer taken of family members and/or friends. As non-limiting examples, the images can be photos taken during an event (e.g., wedding, christening, birthday party, etc.), a holiday celebration (Christmas. July 4, Easter, etc.), a vacation, or any other occasion. Another example source is images captured by an image sensor of, e.g., entertainment or sports celebrities, or reality television individuals. The images can be taken of one or more members of a family near an attraction at an amusement park. In an example use scenario, a system and method disclosed herein is applied to images in a database of images, such as but not limited to images captured using imaging devices (such as but not limited to surveillance devices, or film footage) of an area located at an airport, a stadium, a restaurant, a mall, outside an office building or residence, etc. In various examples, each image collection can be located in a separate folder in a database, or distributed over several folders. It will be appreciated that other sources are possible.

Figure 1B:
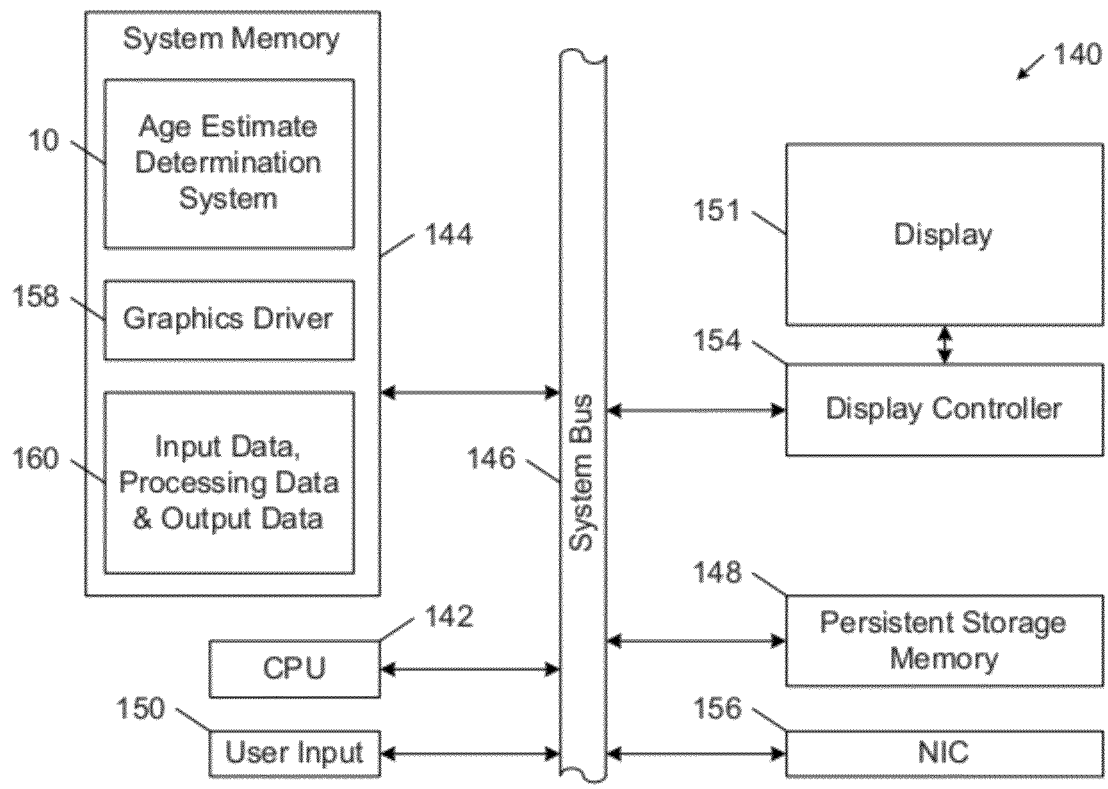
FIG. 1B is a block diagram of an example of a computer system that incorporates an example of the age estimate determination system of FIG. 1A.

FIG. 1B shows an example of a computer system 140 that can implement any of the examples of the age estimate determination system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus; and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, digital video disks, or a data center, including a data center in the cloud) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 1B, the system memory 144 also stores the age estimate determination system 10, a graphics driver 158, and processing information 160 that includes input data, processing data, and output data. In some examples, the age estimate determination system 10 interfaces with the graphics driver 158 to present a user interface on the display 151 for managing and controlling the operation of the age estimate determination system 10.

The age estimate determination system 10 can include discrete data processing components, each of which may be in the form of any one of various commercially available data processing chips. In some implementations, the age estimate determination system 10 is embedded in the hardware of any one of a wide variety of digital and analog computer devices, including desktop, workstation, and server computers. In some examples, the age estimate determination system 10 executes process instructions (e.g., machine-readable instructions, such as but not limited to computer software and firmware) in the process of implementing the methods that are described herein. These process instructions, as well as the data generated in the course of theft execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

The principles set forth in the herein extend equally to any alternative configuration in which age estimate determination system 10 has access to image collection 12. As such, alternative examples within the scope of the principles of the present specification include examples in which the age estimate determination system 10 is implemented by the same computer system, examples in which the functionality of the age estimate determination system 10 is implemented by a multiple interconnected computers (e.g., a server in a data center and a user's client machine), examples in which the age estimate determination system 10 communicates with portions of computer system 140 directly through a bus without intermediary network devices, and examples in which the age estimate determination system 10 has a stored local copies of image collection 12.

Figure 2:
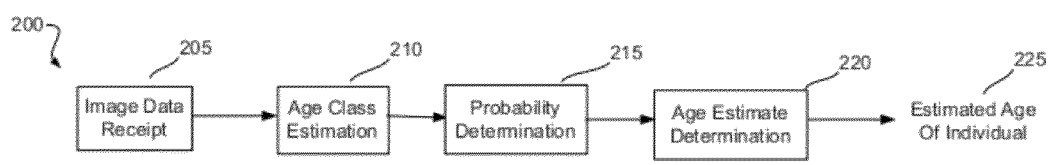
FIG. 2 is a block diagram of an example functionality implemented by an illustrative computerized age estimate determination system.

Referring now to FIG. 2, a block diagram is shown of an illustrative functionality 200 implemented by age estimate determination system 10 for determining an estimated age of an individual based on images, consistent with the principles described herein. Each module in the diagram represents an element of functionality performed by the processing unit 142. Arrows between the modules represent the communication and interoperability among the modules. In brief, image data representative of images in an image collection is received in block 205, the image collection including images of the individual of interest. Age class estimation is performed in block 210 based on the image data to classify images into age classes. Probability determination is performed in block 215, and age estimate determination is performed in block 220 to provide the estimated age of the individual 225.

Figure 3:
FIG. 3 is an example image collection.

Referring to block 205, image data representative of images in an image collection is received. FIG. 3 shows an example image collection to which the systems and methods herein can be applied. The image collection includes images of the individual of interest, but may include images of other people as well. Examples of image data representative of images include pixel values of the image.

Referring to block 210, to classify images into age classes, age class estimation is performed by a module based on image data. The image data can be data indicative of face regions of the images. In an example, the age class estimation is applied to image data resulting from the operation of a face detector on the images of the image collection. Face detection is used to locate the face of the individual of interest in an image.

Figure 4:
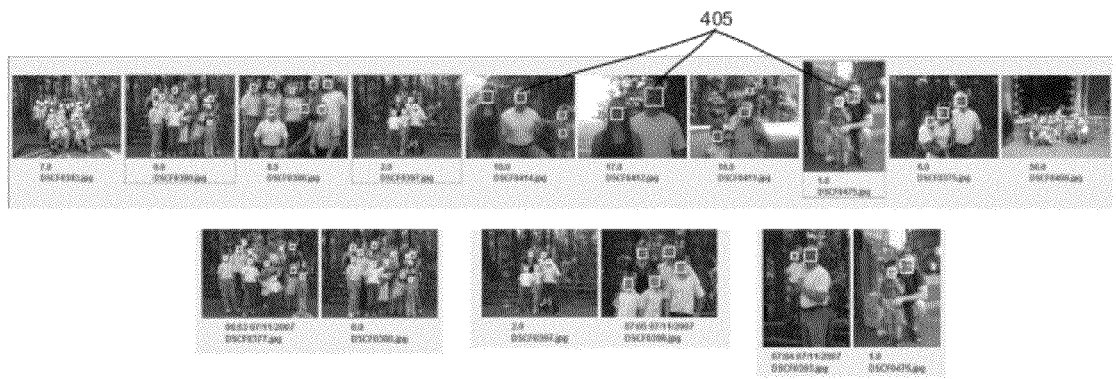
FIG. 4 shows an example with face detection performed on images from the image collection of FIG. 3, where the boxes indicate detected faces.

Face detection is applied to detect at least one face region in the images, for example, using a face detection algorithm. The face detection can be performed on the image forming elements of the images. Face detection can be performed by the same module that applies the age class estimation or by a different module. In an example, all images in the image collection are processed in order to detect faces. In another example, it may be desirable to limit the face detection to only some of the images in the collection, particularly if the image collection is very large. FIG. 4 shows examples of images from the collection of FIG. 3, to which a face detector has been applied. In the example of FIG. 4, a box 405 is used to indicate a detected face.

Face clustering can be applied to group the detected faces into respective dusters representing a sub-set of images from the image collection. The detected faces, represented as image data representative of a face, can be clustered into sub-sets that include images having at least one face in common. Non-limiting examples of applicable clustering analysis include a hierarchical clustering analysis, such as an agglomerative hierarchical clustering, or a partitional clustering analysis, such as k-means clustering, fuzzy c-means clustering, or quality threshold (QT) clustering. In an example, an unsupervised machine learning tool is applied for clustering the image collection. A result of the image clustering is the identification of image dusters. The common face is the person who is considered the subject of the cluster. Accordingly, multiple dusters may contain a proportion of images that are the same, but that have several people therein such that different people are the subject of the respective dusters. According to an example, major face dusters are defined that include sub-sets of images from the collection in which the face of the individual of interest appears. A duster in which the individual of interest appears in a large number of images can be classified as a major duster. The number required to classify a duster as a major duster can be a predetermined number (e.g., a number between 5 and 10), or it can be a proportion of the number of images in the collection (such as 10% for example), or can be determined in response to the number of dusters that have been determined. For example, the largest 10% of determined dusters can be classified as major clusters—that is to say, major dusters can be defined as those which are the largest sub-sets of images from those generated. It will be appreciated that other ways of categorizing the sub-sets can be used, and the above is not intended to be limiting. In an example, all sub-sets may be classified as major dusters. With the face clustering technology, images of the individual of interest can be automatically collected.

Age class estimation is performed by a module based on image data of the individual of interest, based on face detection, to classify images into age classes. For a given face image in the collection, an age estimator can be built to classify the face into different age classes. Each age class corresponds to an interval of age. In a non-limiting example, an age estimator can be but to classify images into five (5) different age classes defined as Baby, Child, Youth, Adult and Senior. The age class of Baby may relate to ages from birth to 1 y.o., and Child may relate to ages from 1 to 10 years old. Youth may relate to ages from 10 to 30 years old, Adult may relate to ages from 30 to 60 years old, and Senior may relate to ages greater than 60 years old. More or fewer age classes may be defined in other example. Also, each age class may be defined to correspond to different intervals of age span. In other examples, an age estimator can be but to classify images into age classes defined to cover one or more other age intervals, such as but not limited to, Baby (0-2 y.o.), Toddler (2-4 y.o.), Child (4-10 y.o.), Tween (10-14 y.o.), Teen (14-18 y.o.), Young Adult (18-30 y.o.), Adult, (30-60 y.o.), and/or Senior (greater than 60 y.o.). In an example, the age class estimator is trained to classify a face image as to an age class using a plurality of training face images that have known age. For example, the age estimator can be trained to recognize facial features corresponding to the interval of time corresponding to an age class using images having known age. With the age classification results from the images, an age classifier based on images having a known time stamp can be developed.

In an example, probability determination is performed in block 215. The probability determination is made for images having known time stamp. In an example, each image in the image collection includes a time stamp indicating a date associated with the image. For example, the time stamp can indicate the date that the image was captured. The probability determination can be made for images with time stamps that fall within intervals of time around dates of interest. At each given date of interest, the probability determination is computed for images whose time stamp falls within a certain duration around this given date of interest. In a non-limiting example, the time interval can be about a month. In an example, a probability determination engine is used to determine, for each age class, a value of class probability that an image in the collection falls within the age class.

In an example, the value of class probability that an image falls within an age class is determined based on a value of probability that a subset of images in the collection falls within the age class. The images of the subset have time stamps that fall within an interval of time encompassing the time stamp of the image. That is, the class probability may be computed for images over some period of time, such as but not limited to a number of days, a number of weeks, a month, several months, etc. For example, the class probability of an image may be computed based on a number of images (such as 100 images) taken over the period of a month, but not all having the same time stamp. In an example, the class probability for an age class is computed as a value of probability that images fall within that age class during a period of time. The probability determination can include computing a temporal function that shows how the class probability changes over time for each age class.

An example of probability determination is as follows. Denoting that for a given time or a given period of time (such as but not limited to a number of days, a number of weeks, a month, several months, etc.), the number of face image being classified as being in an ith class is $n_i$, the likelihood (i.e., probability) of a face image belonging to an age class ($P_i$) can be determined according to:

$$P_i = \frac{n_i}{\sum_{i=1}^{k} n_i} \quad (1)$$

where i denotes the integer value of the number of age classes, i=1, 2, ..., k. In an example where five (5) age classes are defined, integer i in Eq(1) takes on values of i=1, 2, ..., 5. In another example, the probability determination may be made based on weighted values.

Figure 5:
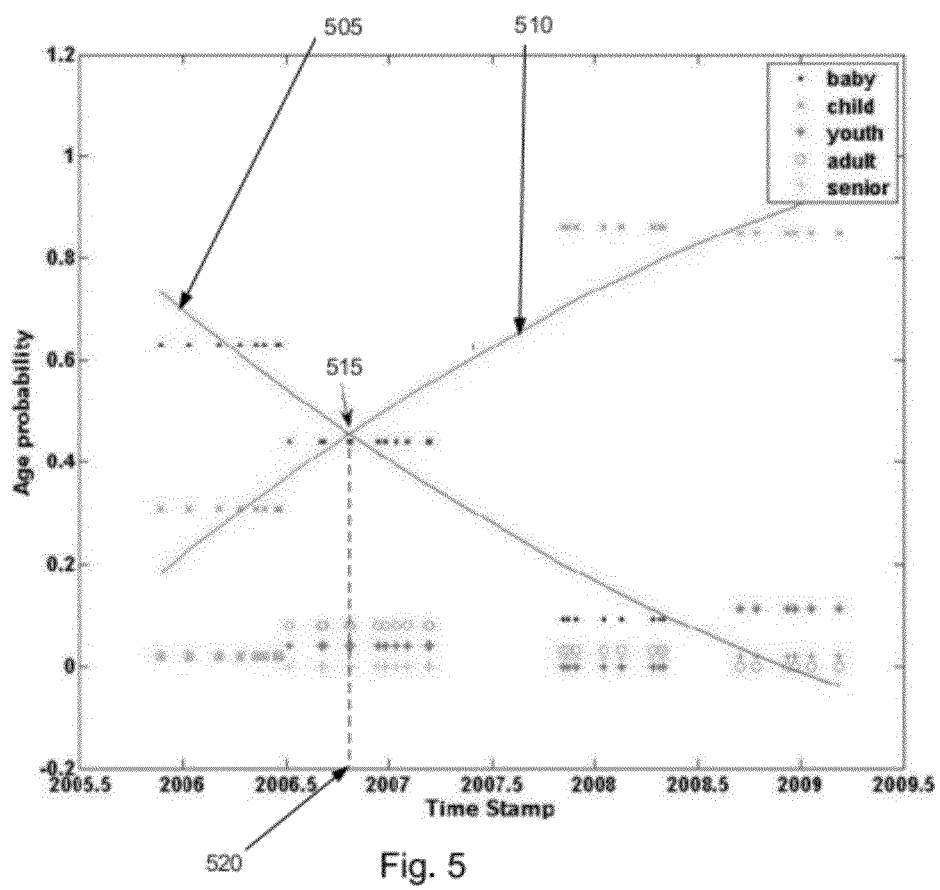
FIG. 5 shows example plot of age probabilities versus image time stamp of images that have been classified into the example age classes of baby, child, youth, adult and senior.

FIG. 5 show an example plot of age probabilities versus image time stamp for a set of images that have been classified into the example age classes of baby, child, youth, adult and senior. Images classified to the age class of baby are indicated by a diamond (♦). Images classified to the age class of child are represented using a cross (x). Images classified to the age class of youth are represented by a star (✗), images classified as adult are indicated by a circle (○), and images classified as senior are indicated by a plus (+). The probabilities in FIG. 5 are plotted against the date of the time stamp of the images, ranging from mid-2005 (plotted as 2005.5) through mid-2009 (plotted as 2009.5). The values of probability computed for each image is shown on the y-axis of the plot. In the example of FIG. 5, images classified, e.g., in the age classes of baby and child, are determined to have values of age probability greater than about 0.1. The images of this example collection that are classified, e.g., in the age classes of adult and senior, are generally determined to have values of age probability of about 0.1 or less.

In block 220, an age estimate determination is performed based on the probabilities computed in block 215, to provide the estimated age of the individual 225. An age determination engine can be used to determine a transition time based on the values of class probability and the known time stamp, and to determine the estimated age of the individual based on the determined transition time. To determine the transition time, the age determination engine fits an age class function to the computed probabilities for images classified in a given age class based on the time stamp of the images. Each age class function corresponds to a respective age class. The transition time can be determined as a value of a cross-point between age class function fits that is above a predetermined threshold value.

In an example, multiple cross-points can be obtained from the age class function fits, with each of these multiple cross-points being above the predetermined threshold value. In this example, a transition time that corresponds to each of these multiple cross-points is determined, and the estimated age of the individual is determined based on the multiple transition times. As a non-limiting example, the time stamps of the images in a collection may range over ten or more years, during which time period the individual might transition from age class toddler to age class child to age class tween. Age class function fits to class probabilities computed for this image collection may produce cross-points between toddler and child, and between child and tween, that are each above a predetermined threshold. Each of these multiple transition points can be used to compute an estimated age of the individual.

Each age class function can be a time-dependent polynomial function, a time-dependent linear function, a time-dependent regression, a time-dependent exponential function fit, or any other appropriate function fit. In an example, for each age class I, a polynomial age class function according to:

$$P_i' = a_{i1}*t^2 + a_{i2}*t + a_{i3} \quad (2)$$

is used to fit the data, where $a_{i1}$, $a_{i2}$, and $a_{i3}$ are coefficients derived from the fit, and t is time. FIG. 5 shows curve 505 resulting from the fit of an age class function to age probabilities of images classified as baby, and curve 510 resulting from the fit of an age class function to age probabilities of images classified as child.

The cross-points of the age class function fits to probabilities for classified images are determined. In the example of FIG. 5, only a single cross-point 515 is shown for clarity. The cross-points for the age class function fits for the other age classes are not shown. In an example, the cross-point having a value greater than a pre-determined threshold value is used to determine the transition time. In the non-limiting example of FIG. 5, the pre-determined threshold value is set at 0.35. Only cross-point 515 has a value above this threshold value. The other cross-points (not shown) fall below the threshold value. The cross-points $P'_{i,j}$, where i and j denote different age classes, and with $P_i'=P_j'$ larger than the pre-determined threshold, are considered the transitional points. The time stamp that corresponds to these transitional points are determined as the transition times. At the transition time, the probability of the estimated age belonging to the ith class is the same as belonging to the jth class. A transition most likely happens at a certain age of the individual of interest when he or she is actually changing from one age class to another. The transition time is used to get the age estimate of the individual's age.

The age determination engine determines the estimated age of the individual of interest based on the transition time. In an example, the age determination engine can determine the estimated age of the individual based on a computation of the birthdate of the individual as the difference between the transition time and a predetermined standardized value that corresponds to the cross-point between the age class functions. The estimated age of the individual is computed based on the computed difference. In an example, the predetermined standardized value can be determined from heuristic rules based on the fuzzy function used in training of the age estimator.

In an example where multiple transition times are determined (e.g., from multiple cross-points from age class function fits that are above the predetermined threshold value), the estimated age of the individual is determined based on the multiple transition times. As a non-limiting example, a candidate estimated age can be computed from each transition time, and the candidate estimated ages are combined to provide the estimated age of the individual. For example, the estimated age can be computed as an average of the candidate estimated ages, a weighted average of the candidate estimated ages, or a mean, a mode or a median of the candidate estimated ages.

In a non-limiting example, the predetermined standardized value is defined based on the training of an age estimator. From age class baby to child, the transition point (and standardized value) is 1 year, e.g., at around 1 y.o., half of face images are classified as baby and other half as child. From age class child to youth, the transition point (and standardized value) is 15 years old. From age class youth to adult, the transition point (and standardized value) is 30 years old. From age class adult to senior, the transition point (and standardized value) is 60 years old. In another example, the standardized values (transition points) can be defined as follows: baby class to child class, the transition point is 1 year old; from child class to youth class, the transition point is 10 years old; from youth class to adult class, the transition point is 18 years old; from adult class to senior class, the transition point is 60 years old.

Based on the time stamp at the transition time, a more precise estimate of the age of the individual of interest can be derived. In an example, the age determination engine computes a difference between the transition time and the predetermined standardized value that corresponds to the cross-point between the age class function fits to determine the estimated age of the individual. In the example of FIG. 5, the transition time 520 from age class baby to child is at 2006.8. Given that the predetermined standardized value corresponding to cross-point 520 of FIG. 5 is 1 year, the estimated birthday for the example individual of interest is determined as the difference between the transition time (2006.8) and the predetermined standardized value (1.0). The result is a value of about 2005.8, which is determined to correspond to an estimated birthdate of around August 2005. Thus, using the transition time and the predetermined standardized value, the estimated age of the individual 225 can be determined.

Figure 6:
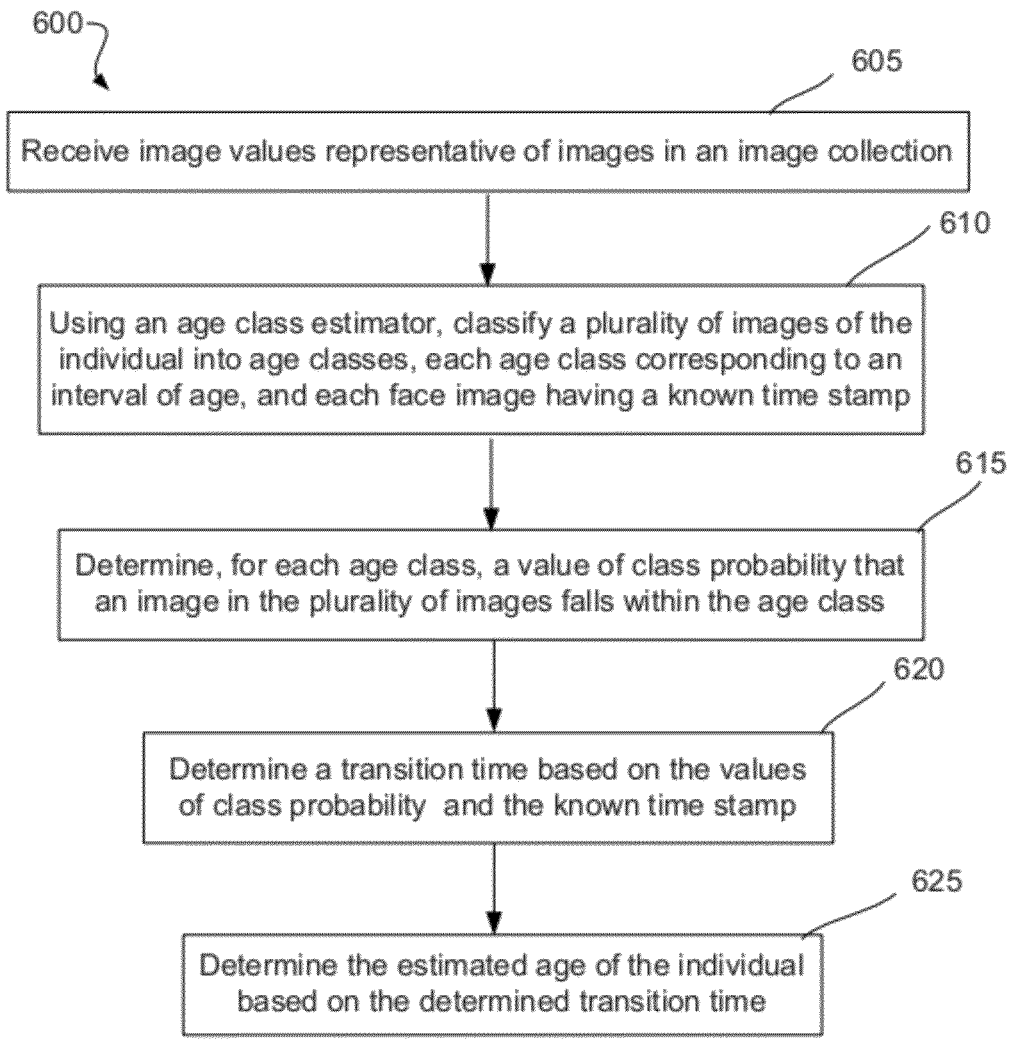
FIG. 6 shows a flow chart of an example process for determining an estimated age of an individual based on images.

FIG. 6 shows a flow chart of an example process 500 for determining an estimated age of an individual based on images in an image collection. The processes of FIG. 6 can be performed as described in connection with FIGS. 2 to 5. In block 605, image data representative of images from a collection of images is received. In block 610, using an age class estimator, a plurality of images of the individual are classified into age classes, each age class corresponding to an interval of age, and each image having a known time stamp. In block 615, for each age class, a value of class probability is determined that an image in the plurality of images falls within the age class. In block 620, a transition tune is determined based on the values of class probability and the known time stamp. In block 625, the estimated age of the individual is determined based on the determined transition time.

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

All references cited herein are incorporated herein by reference in their entirety and for all purposes to the same extent as if each individual publication or patent or patent application was specifically and individually indicated to be incorporated by reference in its entirety herein for all purposes. Discussion or citation of a reference herein will not be construed as an admission that such reference is prior art to the present invention.

What is claimed is:

1. A system for determining an estimated age of an individual, the system comprising:
   a memory for storing computer executable instructions; and
   a processing unit for accessing the memory and executing the computer executable instructions, the computer executable instructions comprising:
      an age class estimator to classify a plurality of images of the individual into age classes, each age class corresponding to an interval of age, and each image having a known time stamp;
      a probability determination engine to determine, for each age class, a value of class probability that an image in the collection falls within the age class; and
      an age determination engine to determine a transition time based on the values of class probability and the known time stamp, and to determine the estimated age of the individual based on the determined transition time.

2. The system of claim 1, wherein the probability determination engine comprises instructions executable to compute the value of class probability that the image falls within the age class based on a value of probability that a subset of images in the collection falls within the age class, and wherein the subset of images have time stamps that falls within an interval of time that encompasses the known time stamp of the image.

3. The system of claim 1, wherein the age class estimator comprises instructions executable to perform face detection on an image collection, identify images in the image collection that comprise the individual based on the face detection, and classify the identified images into age classes based on the face detection.

4. The system of claim 1, wherein, to determine the transition time, the age determination engine comprises computer executable instructions to:
   for each age class, fit an age class function to the computed probabilities for images classified in the age class based on the time stamp of the images, wherein each age class function corresponds to a respective age class; and
   determine the transition time as a value of a cross-point between age class function fits that is above a predetermined threshold value.

5. The system of claim 4, wherein each age class function is a time-dependent polynomial function.

6. The system of claim 5, wherein the time-dependent polynomial function ($P_i'$) is computed according to $P_i'(t) = a_{i1}t^2 + a_{i2}t + a_{i3}$, wherein i corresponds to each age class, wherein t is time, wherein $a_{i1}$, $a_{i2}$, and $a_{i3}$ are coefficients derived from the fit, wherein the transition time (T) is at the cross-point between the fits to two different age class functions $P_i'$ and $P_j'$, and wherein $P_i'(T) = P_j'(T)$.

7. The system of claim 4, wherein multiple cross-points between age class function fits are above the predetermined threshold value, the age determination engine comprises further comprising instructions executable to:
   determine a transition time that corresponds to each cross-point; and
   determine the estimated age of the individual based on the multiple transition times.

8. The system of claim 4, wherein the pre-determined threshold is a value of probability of about 0.35.

9. The system of claim 1, wherein, to determine the age of the individual based on the transition time, the age determination engine further comprises instructions executable to compute a difference between the transition time and a predetermined standardized value corresponding to the cross-point between the two age class function fits, and determine the estimated age of the individual based on the difference.

10. A method performed by a physical computing system comprising at least one processor for determining an age of an individual, said method comprising:
 using an age class estimator, classifying a plurality of images of the individual into age classes, each age class corresponding to an interval of age, and each image having a known time stamp;
 determining, for each age class, a value of class probability that an image in the plurality of images falls within the age class;
 determining a transition time based on the values of class probability and the known time stamp; and
 determining the estimated age of the individual based on the determined transition time.

11. The method of claim 10, further comprising determining the value of class probability that the image falls within the age class based on a value of probability that a subset of images in the collection falls within the age class, and wherein the subset of images have time stamps that falls within an interval of time that encompasses the known time stamp of the image.

12. The method of claim 10, wherein determining the transition time comprises:
 for each age class, fitting an age class function to the computed probabilities for images classified in the age class based on the time stamp of the images, wherein each age class function corresponds to the respective age class; and
 determining the transition time as a value of a cross-point between age class function fits that are above a predetermined threshold value.

13. The method of claim 12, wherein each age class function is a time-dependent polynomial function.

14. The method of claim 13, wherein the polynomial function is computed according to $P_i'=a_{i1}t^2+a_{i2}t+a_{i3}$, wherein i corresponds to an age class, wherein t is time, wherein $a_{i1}$, $a_{i2}$, and $a_{i3}$ are constants derived from the fitting, wherein the transition time (T) is at the cross-point between the fits to two different age class function $P_i'$ and $P_j'$, and wherein $P_i'(T)=P_j'(T)$.

15. The method of claim 12, wherein multiple cross-points between age class function fits are above the predetermined threshold value, and wherein determining the estimated age of the individual further comprises:
 determining a transition time that corresponds to each cross-point; and
 determining the estimated age of the individual based on the multiple transition times.

16. The method of claim 12, wherein the pre-determined threshold is a value of probability of 0.35.

17. The method of claim 10, wherein computing the age of the individual based on the transition time comprises determining the difference of the transition time and a predetermined standardized value corresponding to the cross-point between the two age class functions, and determining the estimated age of the individual based on the difference.

18. A non-transitory computer readable medium having computer executable instructions comprising:
 an age class estimator to classify a plurality of face images of the individual into age classes, each age class corresponding to an interval of age, and each face image having a known time stamp;
 a probability determination engine to determine, for each age class, a value of class probability that an image in the collection falls within the age class; and an age determination engine to determine a transition time based on the values of class probability and the known time stamp, and to determine the estimated age of the individual based on the determined transition time.

19. A non-transitory computer readable medium of claim 18, wherein the probability determination engine comprises instructions executable to compute the value of class probability that the image falls within the age class based on a value of probability that a subset of images in the collection falls within the age class, and wherein the subset of images have time stamps that falls within an interval of time that encompasses the known time stamp of the image.

20. A non-transitory computer readable medium of dam 18, wherein, to determine the transition time, the age determination engine comprises computer executable instructions to: for each age class, fit an age class function to the computed probabilities for images classified in the age class based on the time stamp of the images, wherein each age class function corresponds to the respective age class; and determine the transition time as a value of a cross-point between age class function fits that are above a predetermined threshold value.

21. The non-transitory computer readable medium of claim 20, wherein each age class function is a time-dependent polynomial function ($P_i'$) computed as $P_i'=a_{i1}t^2+a_{i2}t+a_{i3}$, wherein i corresponds to each age class, wherein t is time, and wherein $a_{i1}$, $a_{i2}$, and $a_{i3}$ are constants derived from the fit, wherein the transition time (T)is at the cross-point between the fits to two different age class function age class functions $P_i'$ and $P_j'$, and wherein $P_i'(T)=P_j'(T)$.

22. The non-transitory computer readable medium of claim 20, wherein multiple cross-points between age class function fits are above the predetermined threshold value, the age determination engine comprises further comprising instructions executable to: determine a transition time that corresponds to each cross-point; and determine the estimated age of the individual based on the multiple transition times.

23. A non-transitory computer readable medium of claim 18, wherein, to determine the age of the individual based on the transition time, the age determination engine further comprises instructions executable to compute a difference of the transition time and a predetermined standardized value corresponding to the cross-point between the two age class functions, and determine the estimated age of the individual based on the difference.

* * * * *

UNITED STATES PATENT AND TRADEMARK OFFICE
CERTIFICATE OF CORRECTION

PATENT NO. : 8,565,539 B2  Page 1 of 1
APPLICATION NO. : 13/118897
DATED : October 22, 2013
INVENTOR(S) : Hui Chao et al.

It is certified that error appears in the above-identified patent and that said Letters Patent is hereby corrected as shown below:

In the Claims:

In column 12, line 26, in Claim 20, delete "dam" and insert -- claim --, therefor.

In column 12, line 41, in Claim 21, delete "(T)is" and insert -- (T) is --, therefor.

Signed and Sealed this
Thirty-first Day of December, 2013

Margaret A. Focarino
*Commissioner for Patents of the United States Patent and Trademark Office*